United States Patent [19]
Phelps

[11] Patent Number: 5,261,716
[45] Date of Patent: Nov. 16, 1993

[54] VEHICLE DOOR POCKET

[75] Inventor: Richard A. Phelps, Ferndale, Mich.

[73] Assignee: Chivas Products Limited, Sterling Heights, Mich.

[21] Appl. No.: 934,196

[22] Filed: Aug. 24, 1992

[51] Int. Cl.⁵ ............................................. B60R 7/04
[52] U.S. Cl. ................... 296/37.8; 296/37.13; 296/152
[58] Field of Search ............ 296/37.13, 152, 37.8

[56] References Cited

U.S. PATENT DOCUMENTS

| | | | |
|---|---|---|---|
| 1,877,265 | 9/1932 | Chadwick | 296/37.13 |
| 1,995,143 | 3/1935 | Burch | 296/37.13 |
| 3,730,581 | 5/1973 | Parkinson | 296/37.13 |
| 5,009,458 | 4/1991 | Shute | 296/37.13 |

FOREIGN PATENT DOCUMENTS 378020 1/1940 Italy .
1305189 1/1973 United Kingdom .

Primary Examiner—Robert R. Song
Attorney, Agent, or Firm—Harness, Dickey & Pierce

[57] ABSTRACT

The present invention relates to a vehicle pocket assembly for attachment to the inner panel of a vehicle door and generally comprises a rigid backing member and an integral frontal member. The rigid backing member is adhered against the inner panel of the vehicle door and is provided with a decorative covering. The front member includes a substantially U-shaped frame having first and second side portions, a linearly expandable member including first and second partially adjustable overlapping slats which extend between the first and second side portions and a covering material which houses both the frame and the linearly expandable member. The vehicle pocket assembly is expandable by drawing the first and second slats toward the passenger compartment of the vehicle.

24 Claims, 2 Drawing Sheets

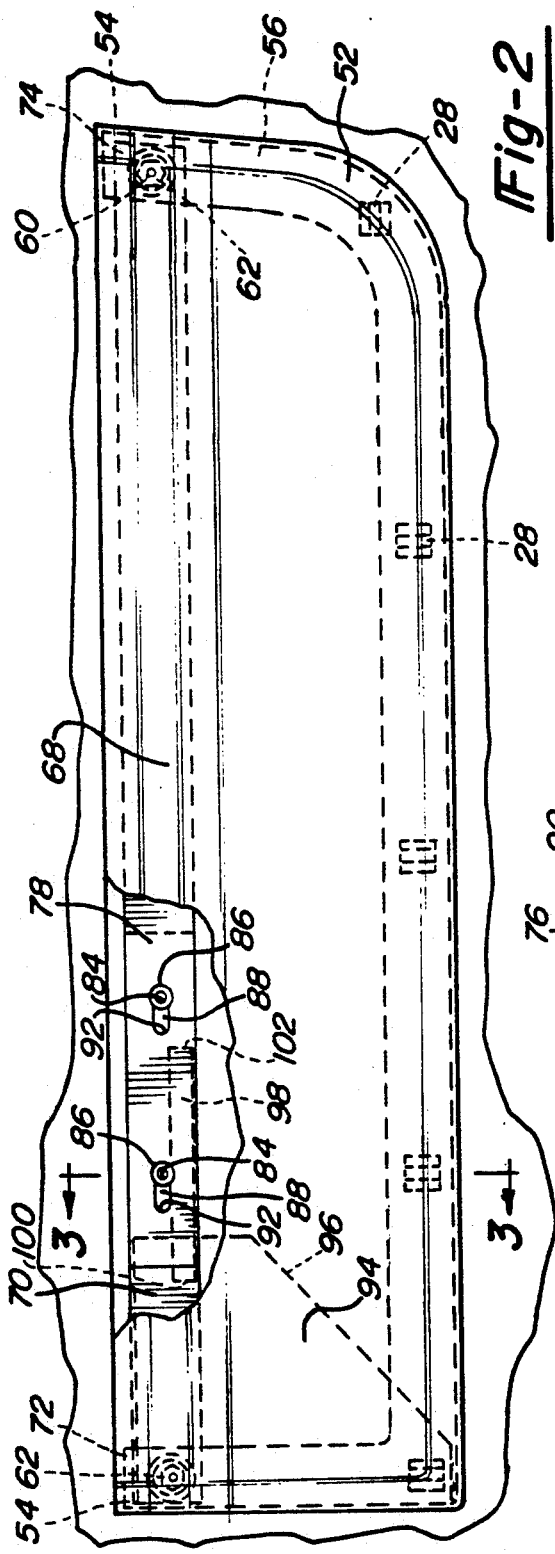
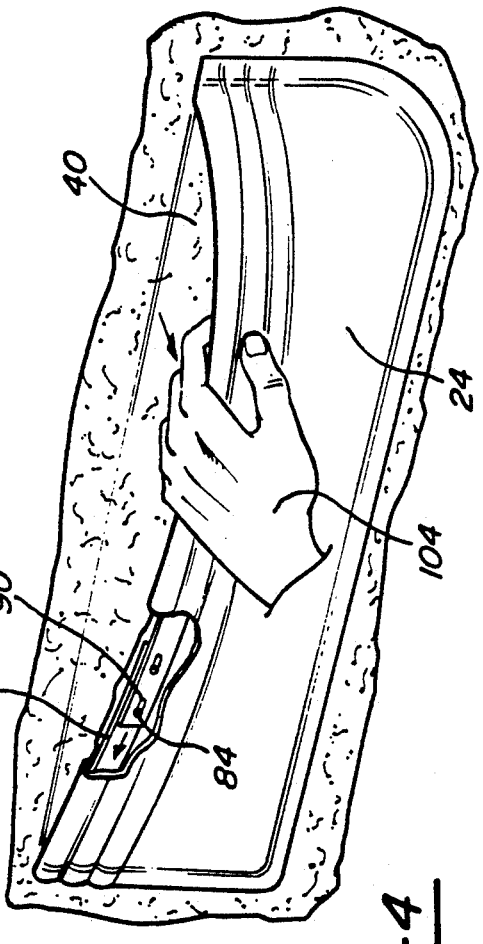

VEHICLE DOOR POCKET

BACKGROUND OF THE INVENTION

1. Field of the Invention

The present invention relates to vehicle pocket assemblies and, more particularly, to pocket assemblies which are integral with the outer surface of a vehicle doors inner panel.

2. Description of Related Art

Vehicle pocket assemblies which extend from the door of a vehicle toward the passenger compartment and which are useful for storing items such as tools, books, maps and other personal items are known in the art. For example, U.S. Pat. No. 3,730,581 which issued May 1, 1973 to Parkinson relates to a vehicle pocket arrangement including a downwardly depending flap covered with trim material which is integral with a filler board of a vehicle body door trim panel. The filler board is slightly larger than the depending flap and has trim material secured to the lateral and lower edge portions thereof to provide a pocket panel having a generally upwardly opening pocket. The pocket panel is positioned to the rear of the trim panel and then is moved upwardly to insert the flap within the pocket. The pocket material includes downwardly pointing integral portions which allow expansion of the pocket while depositing articles within the pocket.

U.S. Pat. No. 1,877,265 which issued Sep. 13, 1932 to Chadwick discloses a vehicle body panel having a pocket structure attached thereto. The pocket structure includes a frame member which is attached within an aperture contained on the door panel and a coil spring which extends across the top of the frame. The pocket is constructed such that it will be resiliently held closed by the coil spring.

The vehicle pocket assembly of the present invention represents an improvement over the previously known vehicle pocket structures in that fewer parts are required for its manufacture. The vehicle pocket assembly of the present invention is attractive in appearance, relatively inexpensive to manufacture, strong and durable in construction and versatile in use.

SUMMARY OF THE INVENTION

In accordance with the present invention, there is provided a vehicle pocket assembly for attachment to the outer surface of a vehicle door inner panel. The vehicle pocket assembly has an overall rectangular shape and comprises a backing member and an integral front member having a selectively enlargeable gap therebetween. The backing member typically includes a rigid structure which is provided with a decorative outer layer. The front member incorporates a relatively flat U-shaped frame with first and second end portions which project upwardly. Extending between the first and second end portions are first and second partially overlapping slats which make up a linearly expandable member. At a first end, each slat is connected to one of the frame ends and at a second end the slats are held in a slideably engaged position by a pair of connecting pins. The pocket assembly can be manipulated to enlarge the gap for receiving articles by pulling the front member toward the passenger compartment and holding it in that position. This movement causes the two slats of the linearly expandable member to slide away from each other which causes the gap to become enlarged. The maximum extent of expandability is controlled by a pair of grooves contained on the outermost of the two slats. At a specified point, movement of the slats relative to each other is limited as the connecting pins engaged a first or second end of the grooves. The front member is covered by a decorative material such as cloth, fiber, vinyl or leather to enhance the appearance of the pocket assembly. An internal flap, including an elastic strip, may also be provided to extend between the backing member and the integral front cover member to assist in retracting the vehicle pocket assembly from an expanded position. In larger pocket assemblies, a pair of internal flaps disposed at opposite ends of the pocket assembly may be utilized to assist in retracting the pocket assembly.

BRIEF DESCRIPTION OF THE DRAWINGS

FIG. 2 is a partial front elevational view showing the vehicle door pocket assembly of FIG. 1 in an unexpanded position;

FIG. 4 is a perspective view of the vehicle pocket assembly of the present invention shown in an expanded position.

BRIEF DESCRIPTION OF THE PREFERRED EMBODIMENT

Figure 1:
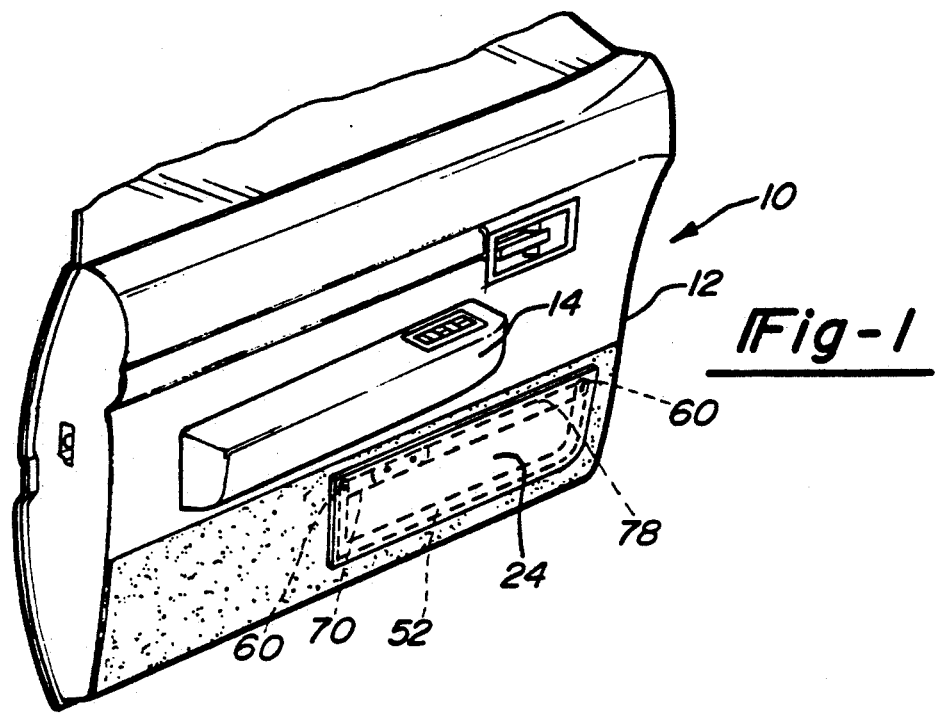
FIG. 1 is a partial perspective view of a vehicle body door including the vehicle door pocket assembly of the present invention.
Figure 3:
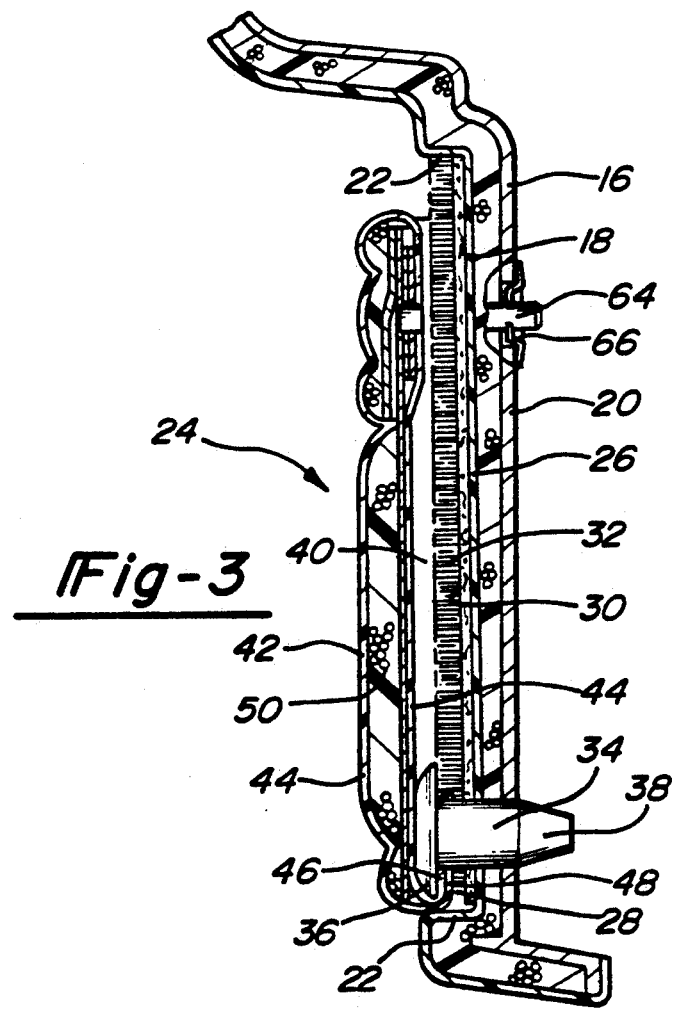
FIG. 3 is a vertical sectional view of the vehicle pocket assembly of the present invention taken along lines 3—3 of FIG. 2.

Referring to FIGS. 1, 2 and 3, the vehicle pocket assembly 24 of the present invention is shown in an unexpanded position. The vehicle pocket assembly 24, which is generally located proximate to a first end 12 of the vehicle door 10 below the level of the armrest 14 comprises a backing member 26 which is located adjacent to the outer surface 18 of the vehicle door's inner panel 16 and an integral front member 42 having a selectively enlargeable gap 40 therebetween for receiving and storing articles.

The backing member 26 preferably is attached within a recessed area 22 of the outer surface 18 to the inner panel 16 either by adhering or stitching the backing member 26 to the inner panel 16. This inner panel can be made from a number of different materials including wood, fiber board, cardboard, steel and plastics, among others. For additional support, a plurality of spaced apart studs 34 are positioned along the bottom edge 28 of the backing member 26 and partially extend through both the backing member 26 and the inner panel 16. Each stud 34 typically includes a relatively flat head portion 36 located at a first end which abuts against the outer surface 30 of the decorative covering 32 provided on the backing member 26 and a second end 38 which extends through the inner panel. The decorative covering 32 may be made of any suitable material such as cloth, fiber, leather or vinyl to enhance the appearance of the vehicle pocket assembly 24.

The front member 42 includes a frame 52 and a linearly expandable member 68. The frame 52 which is relatively flat and has an overall U-shape is generally formed of steel or plastic. The linearly expandable member 68 extends between the first and second ends, 54 and 56, respectively, of the U-shaped frame 52 and includes first and second slats 70 and 78 which are typically formed from steel having spring-like characteristics. The first slat 70 is attached at a first end 72 to the first end 54 of frame 52 by an anchoring pin 60. The anchoring pin 60 includes a head 62 which locks over the outer surface 58 of the frame 52 and a second end 64 which extends through inner panel 16 and is held in placed by a clip 66. Likewise, the second slat 78 is attached at a first end 80 to the second end 56 of frame 52 by a second identical anchoring pin. Again, the head portion of the anchoring pin locks over the outer surface 58 of the frame 52 and a second end of the anchoring pin extends through inner panel 16 and is to be secured in position by an identical clip. Slats 70 and 78 overlap at their second ends 76 and 82, respectively, and are slideably connected by pins 84 which project outwardly from the first slat 70. The pins 84 which extend through grooves 88 and occur on the second slat 78 are provided with oversized heads 86 to hold the slats 70 and 76 contiguously together.

The front member 42 further includes a covering material 44 which is wrapped over the frame 52 and linearly expandable member 68 such that the first and second ends 46 and 48 respectively, of the material are retained under the studs 34. A suitable padding material 50 such as cushioning foam may be included and entrapped by the covering material 44 to give the pocket assembly 10 definition. The front member 42 is decoratively stitched to the back member along the bottom and sides to further adhere the front member 42 to the backing member 26 and to enhance the appearance of the pocket assembly. The covering material 44 is also stitched together along the top edge slightly below the linearly expandable member 68 to maintain the position of the slats within the front member 42.

Referring to FIG. 4, operation of the pocket assembly 24 is demonstrated. The pocket assembly 24 can be manipulated from a normal unexpanded position to an operative position by grasping the pocket assembly 24 and pulling it toward the interior of the vehicle. In the unexpanded position, the connecting pins 84 are positioned against a first end 90 of the grooves 88 and the slats are substantially flat relative to each other. As the front member 42 is pulled away from the backing member 26 by the operator 104, the first slat 70 and the second slat 78 slide linearly away from each other such that the pins 84 now engage the second end 92 of grooves 88. This causes the area of overlap between the first and second slats to become smaller and the slats to bow toward the interior of the vehicle. Articles can now be positioned within or removed from the gap portion 40 of the pocket assembly 24. To return the pocket assembly toward the unexpanded position, the operator 104 merely releases the front member which causes the slats to spring back into the relatively flat more overlapping position.

As demonstrated in FIG. 2, the vehicle pocket assembly may be provided with additional means to assist in retracting the pocket from an expanded position. In one embodiment, a flap 94 made of cloth, fiber, leather or vinyl is sewn along outline 96 or otherwise adhered to the inner surface of the front member 42. Preferably, the flap is formed from a separate piece of material but may be an extension of the front cover material. An elastic strip 98 is also provided to extend between the flap 94 and the backing member 26. Elastic strip 98 is attached along a first end 100 to the flap 94 and at a second end 102 to the backing member 26. Typically, the elastic strip is sewn to both the flap 94 and the backing member 26, although it is contemplated that the elastic strip could be glued or stapled to either surface. As the pocket assembly is expanded, the elastic strip 98 stretches in response. Upon release of the vehicle pocket assembly, the elastic strip 98 recoils to assist in drawing the vehicle pocket assembly closed. In an alternative embodiment, the elastic strip would be adhered directly to the inner surface of the cover thereby eliminating flap 94. Larger vehicle pocket assemblies may additionally be provided with a second flap and integral strip (not shown) disposed at the opposite end of the vehicle pocket assembly to assist in retracting the vehicle pocket assembly.

While the above description constitutes the preferred embodiment of the present invention, it is to be appreciated that the invention is susceptible to modification, variation and change without departing from the proper scope and the fair meaning of the accompanying claims.

I claim:

1. A vehicle pocket assembly for attachment to the interior of a motor vehicle, comprising:
   a rigid backing member;
   a gap for receiving articles between said rigid backing member and a frontal member; and
   said frontal member including a frame, a resilient linearly expandable member and a cover surrounding said frame and linearly expandable member, said frame having an overall U-shape including first and second spaced apart ends, said linearly expandable member extending between the upper end portions of said first and second ends of said frame and including first and second partially overlapping slats which are provided with adjustment means for controlling the size of said gap.

2. The vehicle pocket assembly according to claim 1, wherein said adjustment means comprise at least one pin which projects from said first slat, said at least one pin partially extending through groove means contained on said second slat, said groove means serving to limit the maximum extent of movement between said first and second slats.

3. The vehicle pocket assembly according to claim 2, wherein said first slat contains two projecting pins which extend through said groove means.

4. The vehicle pocket assembly according to claim 1, further comprising an elastic strip extending between said backing member and said cover to assist in retracting the vehicle pocket assembly from an expanded position.

5. The vehicle pocket assembly according to claim 4, wherein the elastic strip extends between the backing member and a flap which is integral with said cover.

6. The vehicle pocket assembly according to claim 5, wherein said flap is a separate piece of material selected from the group consisting of cloth, fiber, leather or vinyl.

7. The vehicle pocket assembly according to claim 1, wherein said frame is substantially U-shaped.

8. The vehicle pocket assembly according to claim 7, wherein said frame is made from a material selected from the group consisting of plastic or steel.

9. The vehicle pocket assembly according to claim 1, wherein said backing member is provided with decorative outer layer.

10. The vehicle pocket assembly according to claim 1, wherein said cover is stitched below said slats to maintain said linearly expandable member in alignment.

11. The vehicle pocket assembly according to claim 3, wherein said first and second slats are made of flexible steel.

12. The vehicle pocket assembly according to claim 1, wherein said cover is made of a material selected from the group consisting of cloth, fiber, leather or vinyl.

13. A vehicle pocket assembly for attachment to the inner panel of a motor vehicle comprising:
  a rigid backing member;
  an integral frontal member including a frame, a linearly expandable member and a covering which surrounds both said frame and said linearly expandable member, said frame having a basilar portion and spaced apart side portions, said linearly expandable member extending between and being connected to said side portions of said frame and including first and second partially overlapping slats which are adjustably connected; and
  selectively expandable gap means located between said backing member and said frontal member for receiving articles;
  whereby the area of said gap means is altered upon manipulation of said slats wherein the area of overlap between said first and second slats changes.

14. The vehicle pocket assembly according to claim 13, further comprising an elastic strip extending between said backing member and said covering to assist in retracting the vehicle pocket assembly from an expanded position.

15. The vehicle pocket assembly according to claim 14, wherein the elastic strip extends between the backing member and a flap which is integral with said cover.

16. The vehicle pocket assembly according to claim 15, wherein said flap is a separate piece of material selected from the group consisting of cloth, fiber, leather or vinyl.

17. The vehicle pocket assembly according to claim 13, wherein said first slat contains at least one pin projecting therefrom, said at least one pin extending through groove means contained on the second slat to adjustably secure said first and second slats together.

18. The vehicle pocket assembly according to claim 17 wherein said first slat has two projecting pins which extend through said groove means.

19. The vehicle pocket assembly according to claim 13, wherein said rigid backing member is made of a material selected from the group consisting of wood, fiberboard, cardboard, steel or plastic.

20. The vehicle pocket assembly according to claim 19, wherein said backing member is provided with a decorative covering selected from the group consisting of clothing, fiber, vinyl or leather.

21. The vehicle pocket assembly according to claim 13, wherein said frame is substantially U-shaped.

22. The vehicle pocket assembly according to claim 13, wherein said vehicle pocket assembly is attached to said inner panel by a plurality of studs.

23. The vehicle pocket assembly according to claim 13, wherein said first and second slats are made from flexible steel.

24. The vehicle pocket assembly according to claim 13, wherein said cover includes a line of stitching located below said first and second slats for maintaining said slats in alignment.

* * * * *